United States Patent
Kim et al.

(10) Patent No.: US 12,339,363 B2
(45) Date of Patent: Jun. 24, 2025

(54) APPARATUS AND METHOD FOR RECOGNIZING HIGH-ELEVATION STRUCTURE USING LIDAR SENSOR

(71) Applicants: HYUNDAI MOTOR COMPANY, Seoul (KR); KIA CORPORATION, Seoul (KR)

(72) Inventors: Nam Gyun Kim, Seongnam-si (KR); Mu Gwan Jeong, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 1078 days.

(21) Appl. No.: 17/244,665

(22) Filed: Apr. 29, 2021

(65) Prior Publication Data

US 2022/0171061 A1    Jun. 2, 2022

(30) Foreign Application Priority Data

Dec. 2, 2020   (KR) .................. 10-2020-0166533

(51) Int. Cl.
*G01S 17/89*    (2020.01)
*G06V 10/75*    (2022.01)
*G06V 20/56*    (2022.01)

(52) U.S. Cl.
CPC ............ *G01S 17/89* (2013.01); *G06V 10/751* (2022.01); *G06V 20/56* (2022.01)

(58) Field of Classification Search
CPC .... G01S 7/4802; G01S 7/4808; G01S 7/4861; G01S 7/4866; G01S 7/487; G01S 7/4876; G01S 17/06; G01S 17/42; G01S 17/88; G01S 17/89; G06V 10/751; G06V 20/56
See application file for complete search history.

(56) References Cited

U.S. PATENT DOCUMENTS

| | | | |
|---|---|---|---|
| 2005/0088642 A1* | 4/2005 | Singh | G01S 7/4811 |
| | | | 356/5.01 |
| 2018/0210087 A1* | 7/2018 | Olson | G01S 17/42 |
| 2019/0219697 A1 | 7/2019 | Castorena Martinez | |
| 2020/0183007 A1* | 6/2020 | Nagashima | G01S 17/93 |
| 2020/0210779 A1* | 7/2020 | Atsmon | G05D 1/0088 |
| 2021/0150230 A1* | 5/2021 | Smolyanskiy | G06V 10/764 |
| 2021/0405155 A1* | 12/2021 | Shand | G01S 7/4815 |

FOREIGN PATENT DOCUMENTS

| | | | | |
|---|---|---|---|---|
| CN | 110120010 A | * | 8/2019 | .......... G06K 9/4652 |
| KR | 10-2019-0045006 | | 5/2018 | |
| KR | 10-2018-0103462 | | 9/2018 | |
| WO | WO-2019198789 A1 | * | 10/2019 | |

* cited by examiner

*Primary Examiner* — Yuqing Xiao
*Assistant Examiner* — Benjamin Richard Hebert
(74) *Attorney, Agent, or Firm* — Slater Matsil, LLP

(57) ABSTRACT

An apparatus and a method for recognizing a high-elevation structure using a LiDAR sensor are provided. The apparatus includes an object-sensing unit configured to output a point cloud, acquired by sensing an object, as LiDAR data, a point-extracting unit configured to extract points associated with a high-elevation structure, which corresponds to an object having a height greater than or equal to a predetermined level, from among points included in the LiDAR data, and an information-generating unit configured to generate the contour of the high-elevation structure and estimate the location of the high-elevation structure using the extracted points and to output the generated contour and the estimated location as information representing the high-elevation structure.

19 Claims, 16 Drawing Sheets

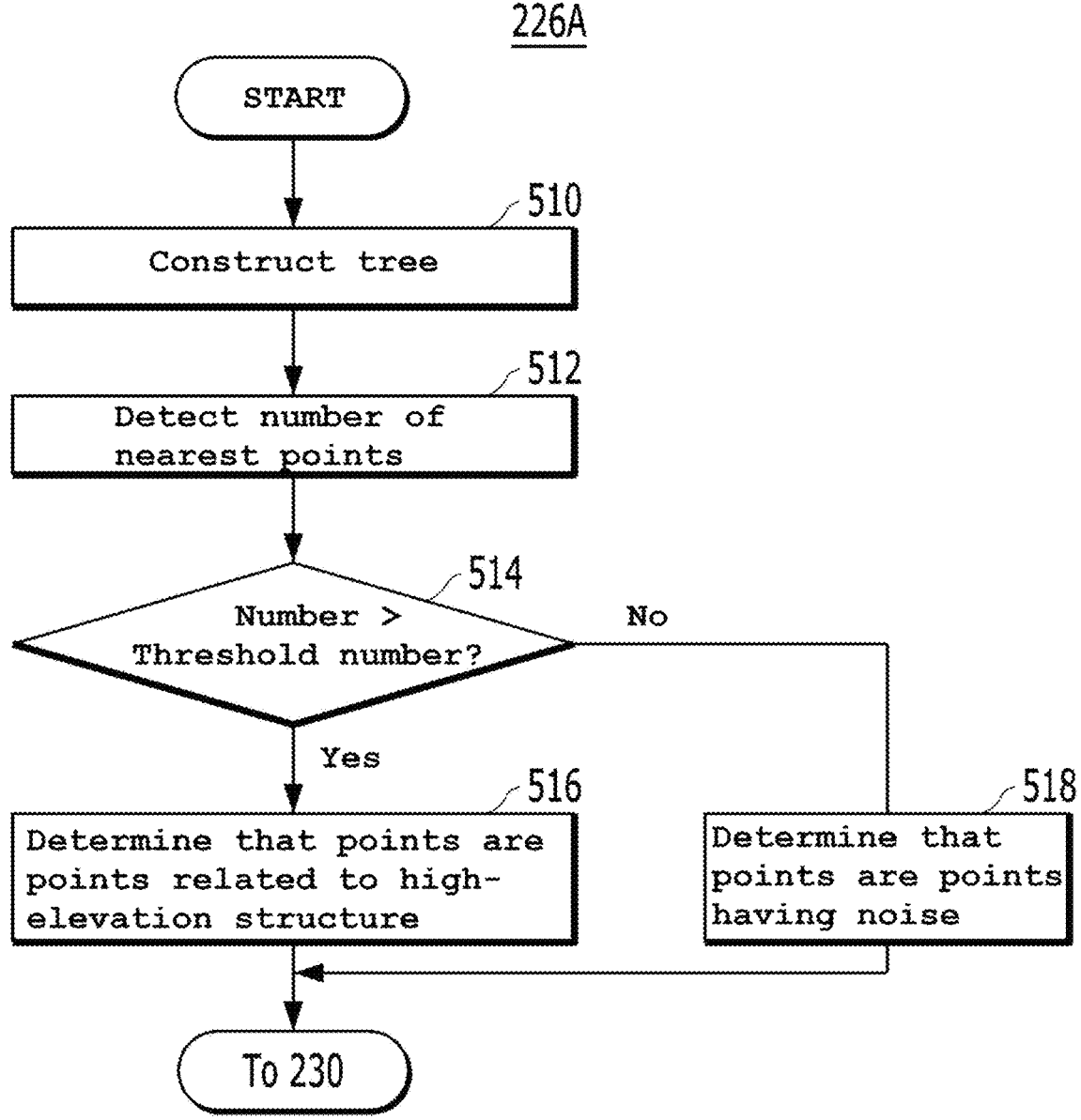

FIG. 10A
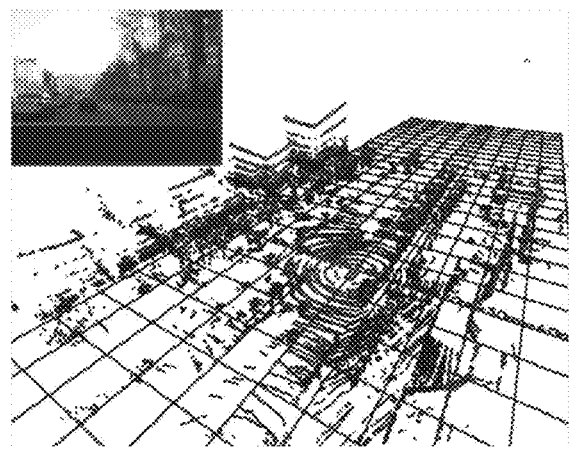
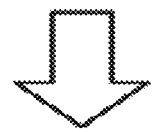
FIG. 10B
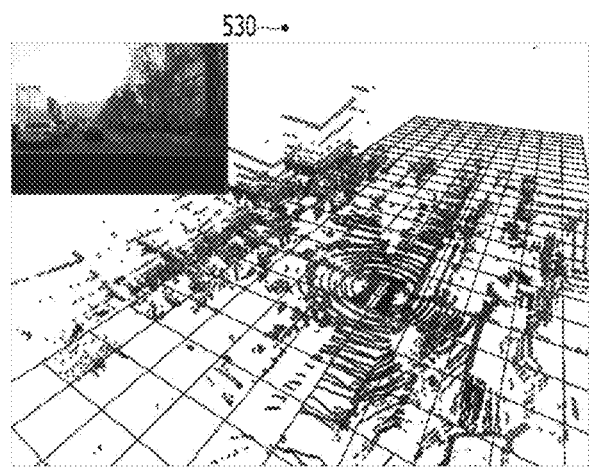

FIG. 13A
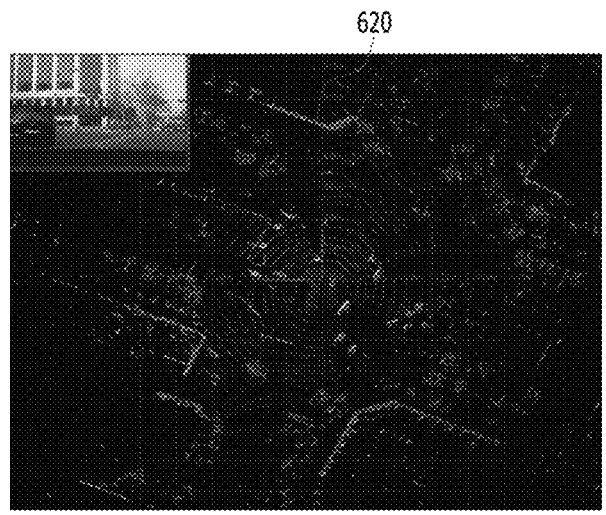
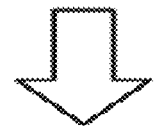
FIG. 13B
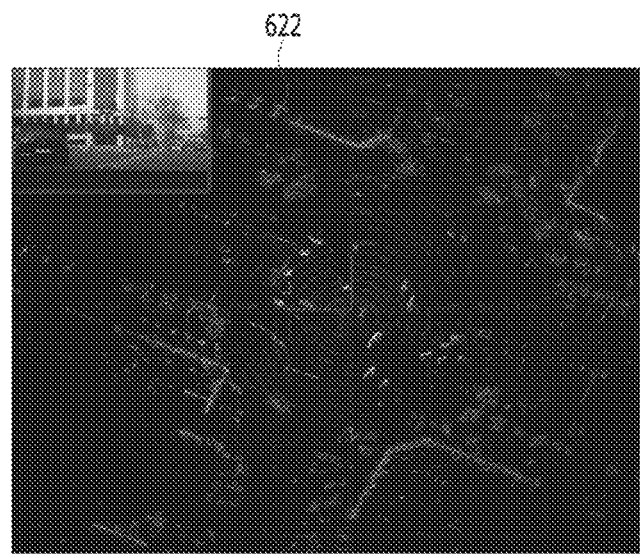

FIG. 14A
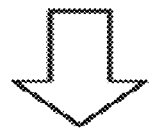
FIG. 14B
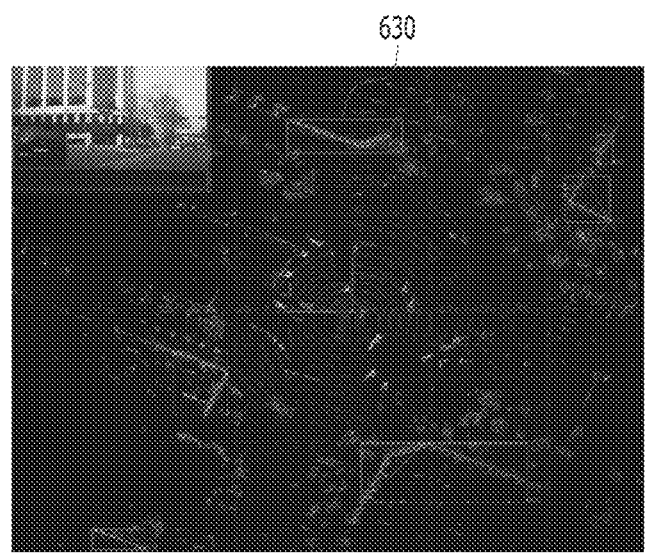

APPARATUS AND METHOD FOR RECOGNIZING HIGH-ELEVATION STRUCTURE USING LIDAR SENSOR

CROSS-REFERENCE TO RELATED APPLICATION

This application claims the priority to and the benefit of Korean Patent Application No. 10-2020-0166533, filed on Dec. 2, 2020, which is hereby incorporated by reference in its entirety.

TECHNICAL FIELD

The present disclosure relates to an apparatus and a method for recognizing a high-elevation structure using a LiDAR sensor.

BACKGROUND

Using a point cloud obtained by a LiDAR sensor, the location of a host vehicle may be estimated, and estimation of the location of a host vehicle may be assisted. As examples of various methods of estimating the location of a host vehicle using a LiDAR sensor, a map may be simply constructed using a LiDAR sensor, or simultaneous localization and mapping (SLAM), in which the location of a host vehicle is recognized based on the entire point cloud and a surrounding environment map is constructed simultaneously therewith, may be performed. However, these conventional methods have a limitation in that it is difficult to recognize a structure having a greater height than a host vehicle in real time.

SUMMARY

Accordingly, the present disclosure relates to an apparatus and a method for recognizing a high-elevation structure using a LiDAR sensor.

Embodiments provide an apparatus and a method for recognizing a high-elevation structure using a LiDAR sensor that are capable of recognizing information about a high-elevation structure.

However, objects to be accomplished by the embodiments are not limited to the above-mentioned objects, and other objects not mentioned herein will be clearly understood by those skilled in the art from the following description.

An apparatus for recognizing a high-elevation structure using a LiDAR sensor according to an embodiment may include an object-sensing unit configured to output a point cloud, acquired by sensing an object, as LiDAR data, a point-extracting unit configured to extract points related to a high-elevation structure, which corresponds to an object having a height greater than or equal to a predetermined level, from among points included in the LiDAR data, and an information-generating unit configured to generate the contour of the high-elevation structure and estimate the location of the high-elevation structure using the points extracted by the point-extracting unit and to output the generated contour and the estimated location as information about the high-elevation structure.

For example, the point-extracting unit may include a verticality inspection unit configured to select points satisfying verticality from among the points included in the LiDAR data, a horizontality inspection unit configured to select points satisfying horizontality from among the points satisfying the verticality, and a point-filtering unit configured to remove points having noise from among points satisfying both the verticality and the horizontality through density inspection.

For example, when points of $0^{th}$ to $M-1^{th}$ (where M is a positive integer of 2 or greater) channels are sensed simultaneously at every predetermined unit angle (x), if a point of each channel vertically overlaps a point of another channel, the verticality inspection unit may determine that the point of each channel satisfies the verticality.

For example, in order to check whether a point of the $m^{th}$ ($1 \le m \le M$) channel satisfies the verticality, the verticality inspection unit may obtain a verticality vector between a point (PNT(f,m)) ($1 \le f \le F$, $F=360/x$) of the $m^{th}$ channel and a point (PNT(f,m$-$k)) of the m$-$k$^{th}$ ($1 \le k \le M$) channel, may obtain the magnitude and the angle of the verticality vector, and may determine that the point of the $m^{th}$ channel is a point satisfying the verticality when the obtained magnitude is less than a vertical threshold magnitude and the obtained angle is less than a vertical threshold angle.

For example, the horizontality inspection unit may select a size and a moving direction of a moving window, may detect the number of points that satisfy the verticality within a moving window in which points satisfying the verticality among the points of the $0^{th}$ to $M-1^{th}$ channels are included, and may determine that the points satisfying the verticality also satisfy the horizontality when the detected number is greater than a predetermined number.

For example, in order to check whether a point (PNT(f,n)) of the $n^{th}$ channel ($0 \le n \le M-1$) sensed in the $f^{th}$ sequential position satisfies the horizontality, the horizontality inspection unit may obtain a horizontality vector between a point (PNT(f+1,n)) of the $n^{th}$ channel sensed in the f+1$^{th}$ sequential position and the point (PNT(f,n)) of the $n^{th}$ channel sensed in the $f^{th}$ sequential position when the point (PNT(f,n)) of the $n^{th}$ channel is a point satisfying the verticality, may obtain the magnitude and the angle of the horizontality vector, and may determine that the point (PNT(f,n)) of the $n^{th}$ channel is a point satisfying the horizontality when the obtained magnitude is less than a horizontal threshold magnitude and the obtained angle is less than a horizontal threshold angle.

For example, the point-filtering unit may construct a tree based on points satisfying both the verticality and the horizontality, may detect the number of points that are the nearest to respective points of the constructed tree, and when the detected number is not greater than a threshold number, may determine that points satisfying both the verticality and the horizontality are points having noise, and may remove the points satisfying both the verticality and the horizontality.

For example, the information-generating unit may include a map-generating unit configured to generate a grid map based on the points related to the high-elevation structure, extracted by the point-extracting unit, a point-labeling unit configured to label points on the grid map, and a contour-generating and location-estimating unit configured to generate the contour of the high-elevation structure by connecting the contours of groups labeled by the point-labeling unit and to estimate the location where the generated contour is present as the location of the high-elevation structure.

For example, the information-generating unit may further include a post-processing unit configured to remove a group having a size smaller than a group threshold size from among the groups labeled by the point-labeling unit.

A method of recognizing a high-elevation structure using a LiDAR sensor according to another embodiment may include acquiring a point cloud as LiDAR data by sensing an object, extracting points related to a high-elevation structure from among points included in the LiDAR data, the high-elevation structure being an object having a height greater than or equal to a predetermined level, and generating the contour of the high-elevation structure and estimating the location of the high-elevation structure using the extracted points and determining the generated contour and the estimated location as information about the high-elevation structure.

For example, the extracting the points may include selecting points satisfying verticality from among the points included in the LiDAR data, selecting points satisfying horizontality from among the points satisfying the verticality, and removing points having noise from among points satisfying both the verticality and the horizontality through density inspection.

For example, the selecting points satisfying the verticality may include, when points of $0^{th}$ to $M-1^{th}$ (where M is a positive integer of 2 or greater) channels are sensed simultaneously at every predetermined unit angle x, if a point of each channel vertically overlaps a point of another channel, determining that the point of each channel satisfies the verticality.

For example, the determining that the point of each channel satisfies the verticality may include checking whether a point of the $m^{th}$ ($1 \leq m \leq M$) channel satisfies the verticality, and the checking may include obtaining a verticality vector between a point (PNT(f,m)) ($1 \leq f \leq F$, $F=360/x$) of the $m^{th}$ channel and a point (PNT(f,m-k)) of the $m-k^{th}$ ($1 \leq k \leq M$) channel, obtaining the magnitude and the angle of the verticality vector, and determining that the point of the $m^{th}$ channel is a point satisfying the verticality when the obtained magnitude is less than a vertical threshold magnitude and the obtained angle is less than a vertical threshold angle.

For example, the selecting points satisfying the horizontality may include selecting a size and a moving direction of a moving window, detecting the number of points that satisfy the verticality within a moving window in which points satisfying the verticality among the points of the $0^{th}$ to $M-1^{th}$ channels are included, and determining that the points satisfying the verticality also satisfy the horizontality when the detected number is greater than a predetermined number.

For example, the determining that points satisfying the verticality satisfy the horizontality may include checking whether a point (PNT(f,n)) of the $n^{th}$ channel ($0 \leq n \leq M-1$) sensed in the $f^{th}$ sequential position satisfies the horizontality, and the checking may include obtaining a horizontality vector between a point (PNT(f+1,n)) of the $n^{th}$ channel sensed in the $f+1^{th}$ sequential position and the point (PNT(f,n)) of the $n^{th}$ channel sensed in the $f^{th}$ sequential position when the point (PNT(f,n)) of the $n^{th}$ channel is a point satisfying the verticality, obtaining the magnitude and the angle of the horizontality vector, and determining that the point (PNT(f,n)) of the $n^{th}$ channel is a point satisfying the horizontality when the obtained magnitude is less than a horizontal threshold magnitude and the obtained angle is less than a horizontal threshold angle.

For example, the removing points having noise through the density inspection may include constructing a tree based on points satisfying both the verticality and the horizontality, detecting the number of points that are the nearest to respective points of the constructed tree, and when the detected number is not greater than a threshold number, determining that points satisfying both the verticality and the horizontality are points having noise, and removing the points satisfying both the verticality and the horizontality.

For example, the generating the contour of the high-elevation structure and estimating the location of the high-elevation structure may include generating a grid map based on the extracted points related to the high-elevation structure, labeling points on the grid map, and generating the contour of the high-elevation structure by connecting the contours of labeled groups and estimating the location where the generated contour is present as the location of the high-elevation structure.

For example, the generating the contour of the high-elevation structure and estimating the location of the high-elevation structure may further include removing a group having a size smaller than a group threshold size from among the labeled groups.

DRAWINGS

Arrangements and embodiments may be described in detail with reference to the following drawings in which like reference numerals refer to like elements and wherein:

FIG. 9 is a flowchart of an embodiment of step 226 shown in FIG. 4;

FIG. 10A shows the state in which noise is not removed before step 226A is performed, and FIG. 10B shows the state in which noise is removed by performing step 226A;

FIG. 13A shows the state before step 610 is performed, and FIG. 13B shows the state after step 610 is performed;

FIG. 14A shows the state before step 612 is performed in pixel units, and FIG. 14B shows the state after step 612 is performed;

DETAILED DESCRIPTION

The present disclosure will now be described more fully hereinafter with reference to the accompanying drawings, in which various embodiments are shown. The examples, however, may be embodied in many different forms and should not be construed as being limited to the embodiments set forth herein. Rather, these embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

Hereinafter, an apparatus 100 and a method 200 for recognizing a high-elevation structure using a light detection and ranging (LiDAR) sensor according to an embodiment will be described with reference to the accompanying drawings.

Figure 1:
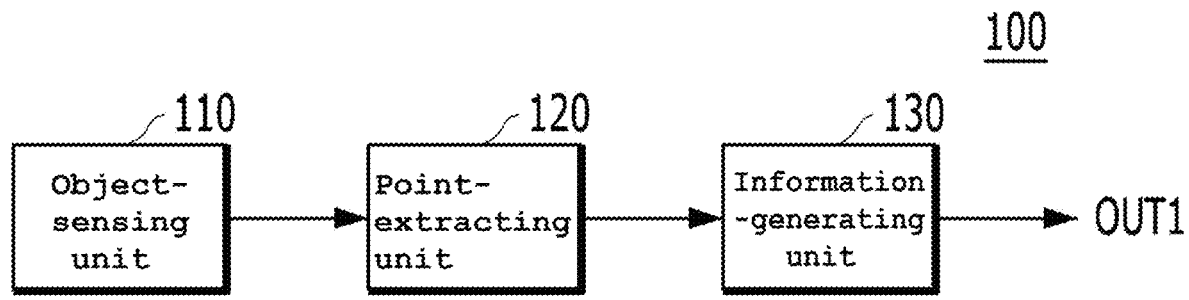
FIG. 1 is a block diagram of an apparatus for recognizing a high-elevation structure using a LiDAR sensor in one form of the present disclosure.
Figure 2:
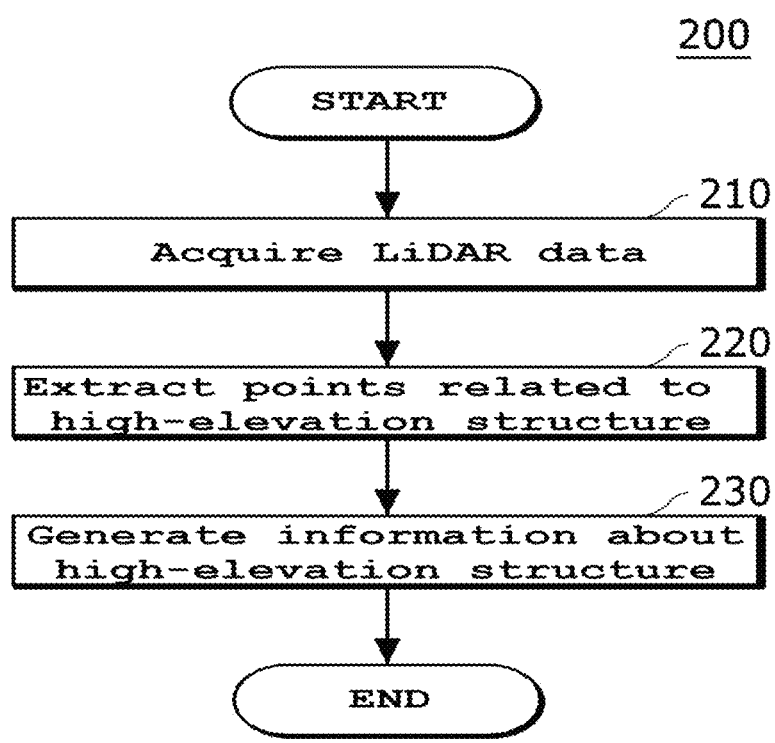
FIG. 2 is a flowchart for explaining a method of recognizing a high-elevation structure using a LiDAR sensor in one form of the present disclosure.

FIG. 1 is a block diagram of an apparatus 100 for recognizing a high-elevation structure using a LiDAR sensor in some forms of the present disclosure, and FIG. 2 is a flowchart for explaining a method 200 of recognizing a high-elevation structure using a LiDAR sensor in some forms of the present disclosure.

Hereinafter, an apparatus 100 for recognizing a high-elevation structure using a LiDAR sensor shown in FIG. 1 will be described as performing a method 200 of recognizing a high-elevation structure using a LiDAR sensor shown in FIG. 2, but the embodiment is not limited thereto. That is, in some forms of the present disclosure, the apparatus 100 for recognizing a high-elevation structure using a LiDAR sensor shown in FIG. 1 may perform a method configured differently from the method 200 of recognizing a high-elevation structure using a LiDAR sensor shown in FIG. 2. Further, the method 200 of recognizing a high-elevation structure using a LiDAR sensor shown in FIG. 2 may be performed by an apparatus configured differently from the apparatus 100 for recognizing a high-elevation structure using a LiDAR sensor shown in FIG. 1.

The apparatus 100 for recognizing a high-elevation structure using a LiDAR sensor shown in FIG. 1 may include an object-sensing unit 110, a point-extracting unit 120, and an information-generating unit 130.

First, the object-sensing unit 110 may output a point cloud, which is composed of a plurality of points acquired by sensing an object, as LiDAR data (step 210). In order to perform step 210, the object-sensing unit 110 may use a LiDAR sensor (e.g. the LiDAR sensor 5 shown in FIG. 6, which will be described later). Here, the object may be another vehicle, a person, an obstacle, etc. that is present outside a vehicle equipped with a LiDAR sensor (hereinafter referred to as a "host vehicle"), but the embodiment is not limited as to the specific type of object.

After step 210, the point-extracting unit 120 extracts points related to a structure, which is an object having a height from the road that is greater than or equal to a predetermined level, from among points included in the LiDAR data output from the object-sensing unit 110 (step 220). Hereinafter, a structure having a height greater than or equal to a predetermined level is referred to as a "high-elevation structure". As examples of a high-elevation structure having a height greater than the height of the host vehicle equipped with a LiDAR sensor, there are buildings, signs, and the like. For example, the predetermined level may be 4 m, but the embodiment is not limited as to the specific value of the predetermined level.

After step 220, the information-generating unit 130 generates the contour of the high-elevation structure and estimates the location of the high-elevation structure using the points extracted by the point-extracting unit 120, and outputs the generated contour and the estimated location through an output terminal OUT1 as information about the high-elevation structure (step 230).

Hereinafter, embodiments of the apparatus 100 shown in FIG. 1 and the method 200 shown in FIG. 2 will be described.

Figure 3:
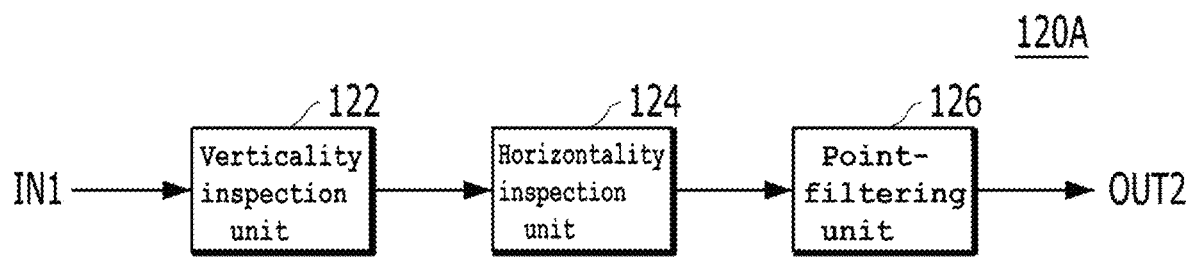
FIG. 3 is a block diagram of an embodiment of the point-extracting unit shown in FIG. 1.
Figure 4:
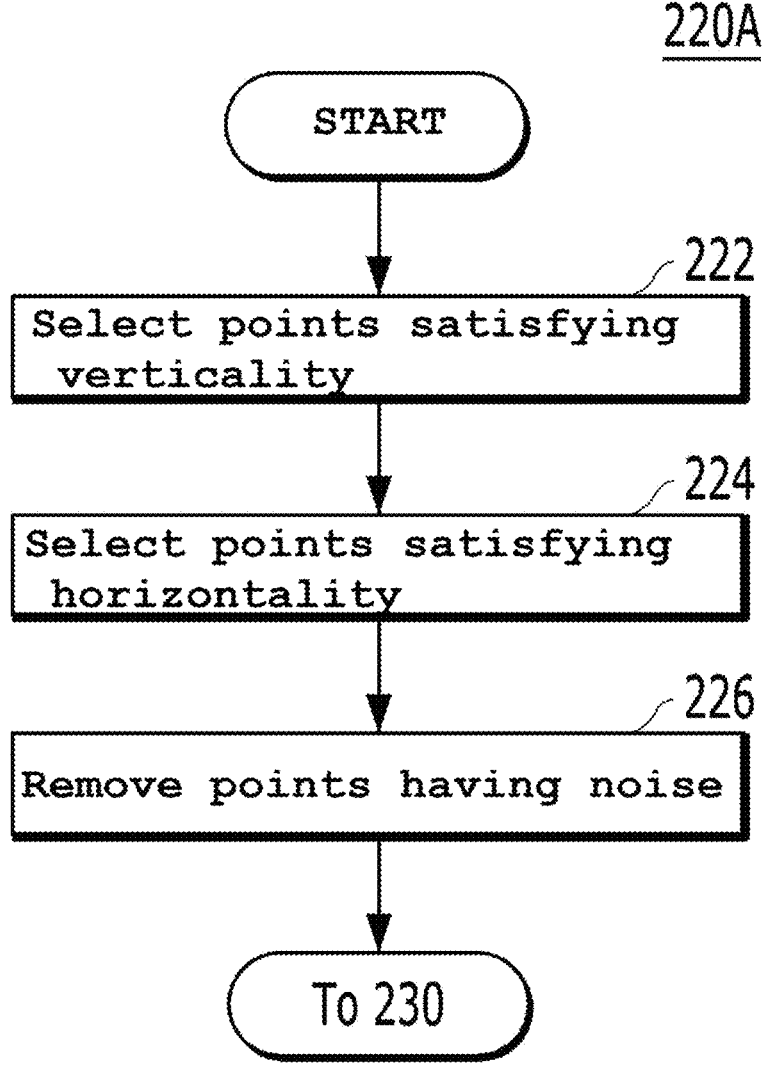
FIG. 4 is a flowchart of an embodiment of step 220 shown in FIG. 2.

FIG. 3 is a block diagram of an embodiment 120A of the point-extracting unit 120 shown in FIG. 1, and FIG. 4 is a flowchart of an embodiment 220A of step 220 shown in FIG. 2.

Hereinafter, the point-extracting unit 120A shown in FIG. 3 will be described as performing step 220A shown in FIG. 4, but the embodiment is not limited thereto. That is, according to another embodiment, the point-extracting unit 120A shown in FIG. 3 may perform a step configured differently from step 220A shown in FIG. 4. In addition, step 220A shown in FIG. 4 may be performed by a point-extracting unit configured differently from the point-extracting unit 120A shown in FIG. 3.

The point-extracting unit 120A shown in FIG. 3 may include a verticality inspection unit 122, a horizontality inspection unit 124, and a point-filtering unit 126.

After step 210, the verticality inspection unit 122 receives the LiDAR data, output from the object-sensing unit 110, through an input terminal IN1, checks whether each of the points included in the LiDAR data satisfies verticality, and selects points having verticality (step 222).

In some forms of the present disclosure, it is assumed that a LiDAR sensor 5 (refer to FIG. 6 to be described later) senses points of $0^{th}$ to M-$1^{th}$ channels at the same time by radiating a laser pulse while rotating by every predetermined unit angle x°. Here, M is a positive integer of 2 or greater. In this case, the verticality of the point of each of the $0^{th}$ to M-$1^{th}$ channels is inspected in a manner such that, when the point of a channel to be inspected (hereinafter referred to as an "inspection target point") vertically overlaps the point of another channel, it is determined that the inspection target point satisfies verticality, i.e. has verticality.

Figure 5:
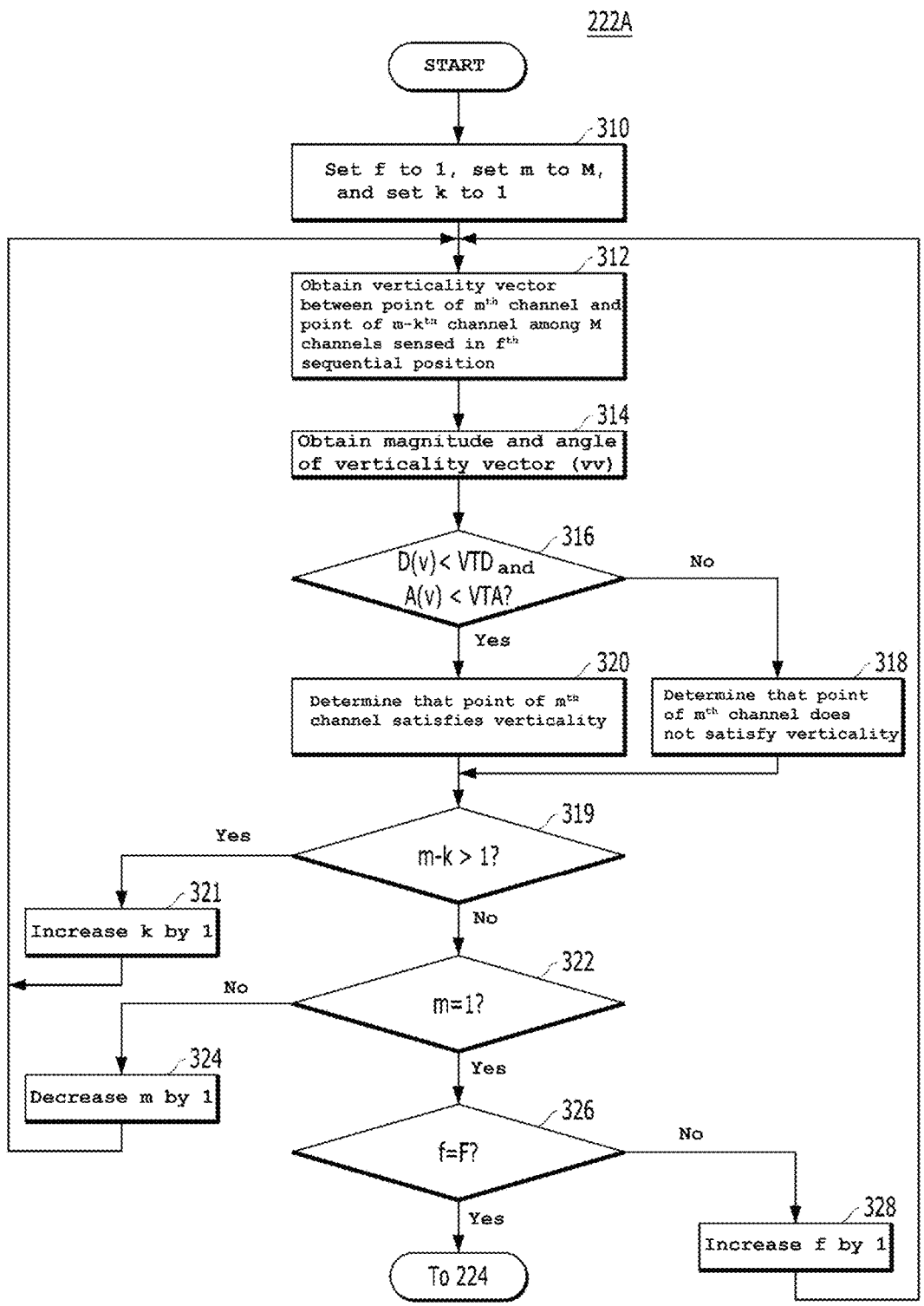
FIG. 5 is a flowchart of an embodiment of step 222 shown in FIG. 4.

FIG. 5 is a flowchart of an embodiment 222A of step 222 shown in FIG. 4. Step 222A shown in FIG. 5 may be performed by the verticality inspection unit 122 shown in FIG. 3.

Referring to FIG. 5, f is set to 1, m is set to M, and k is set to 1 (step 310). Here, 1≤f≤F, 1≤m≤M, and 1≤k≤M. F is the total number of times the points of the M channels are acquired, which may be expressed using Equation 1 below.

$$F = \frac{360}{x} \qquad \text{[Equation 1]}$$

After step 310, the LiDAR sensor included in the object-sensing unit 110 radiates an $f^{th}$ laser pulse and obtains a verticality vector vv between the point PNT(f,m) of the $m^{th}$ channel and the point PNT(f,m−k) of the m−k$^{th}$ channel, among the sensed 0$^{th}$ to M−1$^{th}$ channels, as expressed using Equation 2 below (step 312).

$$vv = PNT(f,m) - PNT(f,m-k) \quad \text{[Equation 2]}$$

After step 312, the magnitude D(v) and the angle A(v) (or direction) of the verticality vector vv are obtained (step 314).

After step 314, whether the obtained magnitude D(v) is less than the vertical threshold magnitude VTD and whether the obtained angle A(v) is less than the vertical threshold angle VTA are checked (step 316). To this end, the verticality inspection unit 122 may include first and second look-up tables (LUTs) (not shown). The first LUT may receive the coordinates of a verticality inspection target point (i.e. the address of the first LUT) as input, and may output the vertical threshold magnitude VTD (i.e. the data of the first LUT) stored for the corresponding address. The second LUT may receive the coordinates of a verticality inspection target point (i.e. the address of the second LUT) as input, and may output the vertical threshold angle VTA (i.e. the data of the second LUT) stored for the corresponding address.

If the obtained magnitude D(v) is not less than the vertical threshold magnitude VTD, or if the obtained angle A(v) is not less than the vertical threshold angle VTA, it is determined that the point PNT(f,m) of the m$^{th}$ channel is a point that does not satisfy verticality (step 318).

However, when the obtained magnitude D(v) is less than the vertical threshold magnitude VTD and the obtained angle A(v) is less than the vertical threshold angle VTA, it is determined that at least one of the point PNT(f,m) of the m$^{th}$ channel or the point PNT(f,m−k) of the m−k$^{th}$ channel satisfies verticality (step 320). For example, when the obtained magnitude D(v) is less than the vertical threshold magnitude VTD and the obtained angle A(v) is less than the vertical threshold angle VTA, it may be determined that the point PNT(f,m) of the m$^{th}$ channel satisfies verticality.

After step 318 or step 320, whether m−k is greater than 1 is checked (step 319).

If m−k is greater than 1, k is increased by 1, and the process goes to step 312 (step 321). However, if m−k is not greater than 1, whether m is 1 is checked (step 322). That is, whether the verticality inspection has been completely performed on the respective points of the 0$^{th}$ to M−1$^{th}$ channels sensed at the same time by radiating the f$^{th}$ laser pulse is checked.

If m is not 1, m is decreased by 1 (step 324). After step 324, the verticality vector is updated by performing step 312 described above, and steps 314 to 321 are performed on the updated verticality vector.

However, if m is 1, whether f is F is checked (step 326). That is, whether the verticality inspection has been completely performed on the respective points of the 0$^{th}$ to M−1$^{th}$ channels sensed by radiating the laser pulse F times is checked.

If f is not F, f is increased by 1 (step 328). After step 328, the verticality vector is updated by performing step 312 described above, and steps 314 to 321 are performed on the updated verticality vector.

That is, whether the point of the m$^{th}$ channel sensed in the f$^{th}$ sequential position satisfies verticality may be checked by performing steps 312 to 321 shown in FIG. 5.

Step 222A shown in FIG. 5 may be performed after points related to the road are extracted. The reason for this is that the height of a high-elevation structure can only be recognized when the road is recognized first.

Figure 6:
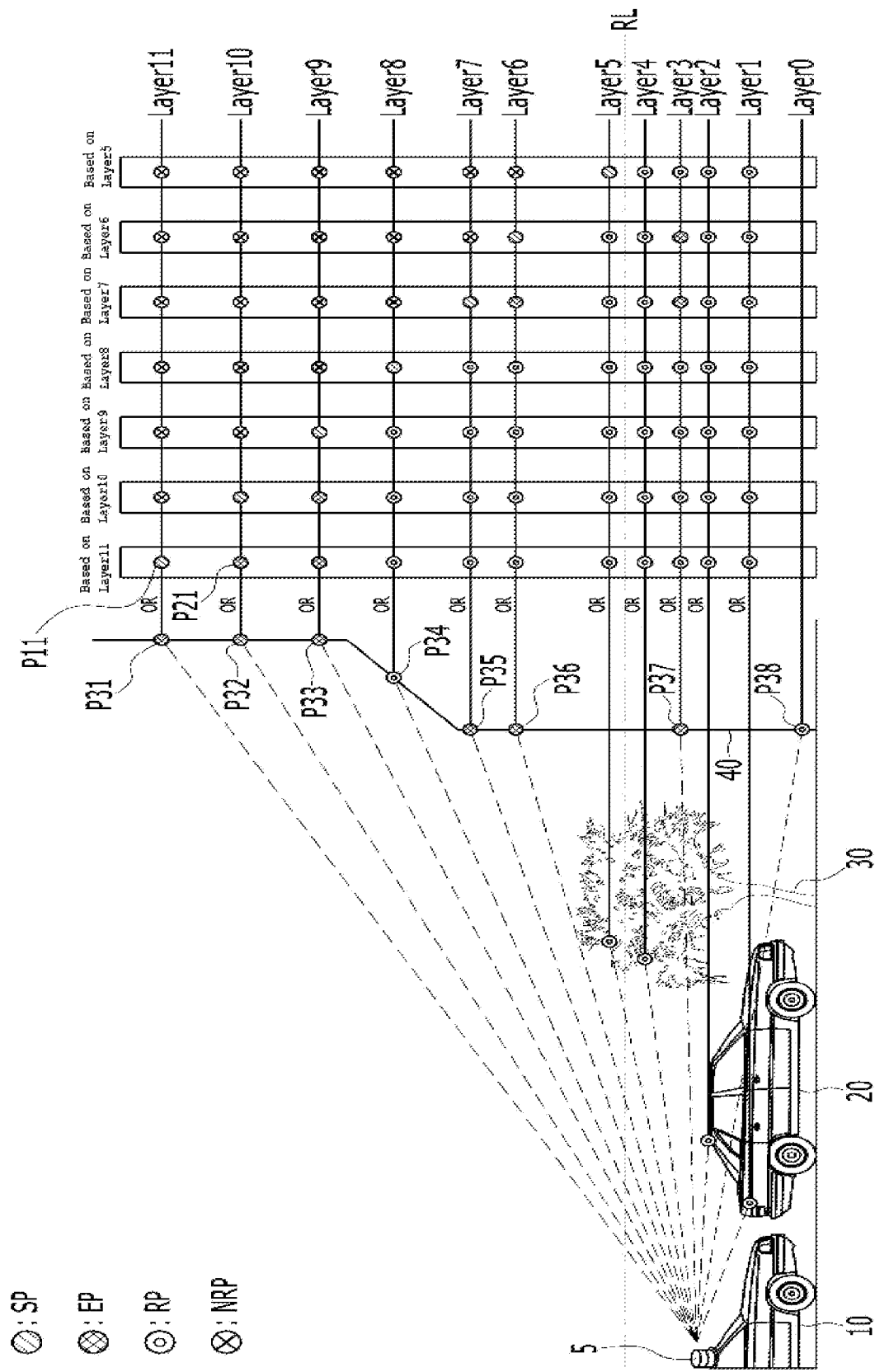
FIG. 6 is a view for helping understanding a verticality inspection unit and step 222A.

Hereinafter, in order to help understanding the process shown in FIG. 5, the verticality inspection unit 122 shown in FIG. 3 and step 222A shown in FIG. 5 will be described with reference to FIG. 6. However, the embodiment is not limited to the process shown in FIG. 6. In the process of FIG. 6, it is assumed that k is 1, M is 12, and F is 1000.

FIG. 6 is a view for helping understanding the verticality inspection unit 122 and step 222A.

Referring to FIG. 6, it can be seen that a laser pulse is radiated toward an object from the LiDAR sensor 5 mounted on the roof of the host vehicle 10. Another vehicle 20, a tree 30, and a high-elevation structure 40 are shown in FIG. 6 as objects.

The object-sensing unit 110 shown in FIG. 1 radiates a single circular laser pulse to the objects 20, 30 and 40 using the LiDAR sensor 5 shown in FIG. 6, and measures the time taken for the laser pulse reflected from the objects present within a measurement range to return, thereby sensing information about the objects such as the distances from the LiDAR sensor 5 to the objects 20, 30 and 40, the orientations of the objects, the speeds of the objects, the temperatures of the objects, the material distribution of the objects, and the concentration characteristics of the objects. The LiDAR sensor 5 may output the results of sensing as the above-described LiDAR data.

A layer shown in FIG. 6 has the same meaning as the channel shown in FIG. 5. That is, the 0$^{th}$ to 11$^{th}$ layers Layer0 to Layer11 shown in FIG. 6 correspond to the 0$^{th}$ to 11$^{th}$ channels shown in FIG. 5, respectively. RL is the aforementioned predetermined level, which may be, for example, 4 m.

Each of the points SP, EP, RP and NRP shown in FIG. 6 has the following meaning.

The point SP is a start point at which inspection of the verticality of the points in the corresponding layer is started. That is, the start point for checking the verticality of the points in each layer is denoted by "SP" in FIG. 6. The point EP is a point having verticality, the point RP is a point not having verticality, and the point NRP is a point that is not related to verticality inspection.

For example, in order to check whether the point p31 in the 11$^{th}$ layer Layer11 has verticality, verticality inspection is performed from the point p11 (SP) in the 11$^{th}$ layer Layer11. The verticality vector between the point p11 (PNT (f,11)) in the 11$^{th}$ layer Layer11 and the point p21 (PNT(f, 10)) in the 10$^{th}$ layer Layer10 is obtained (step 312). Thereafter, whether the magnitude D(v) of the verticality vector is less than the vertical threshold magnitude VTD and whether the angle A(v) of the verticality vector is less than the vertical threshold angle VTA are determined (step 316). At this time, since the point p11 vertically overlaps the point p21, the magnitude D(v) of the verticality vector is less than the vertical threshold magnitude VTD, and the angle A(v) of the verticality vector is less than the vertical threshold angle VTA. Accordingly, since the point p31 in the 11$^{th}$ layer Layer11 is a point having verticality in the section 40 of the high-elevation structure, it is denoted by "EP".

In the same manner as the manner of checking whether the point p31 in the 11$^{th}$ layer Layer11 has verticality, whether the point in the 10$^{th}$ layer Layer10 to the point in the 0$^{th}$ layer Layer0 have verticality may be checked sequentially. Finally, as shown in FIG. 6, when the verticality inspection is completely performed on the point p31 in the 11$^{th}$ layer Layer11 to the point P38 in the 0$^{th}$ layer Layer0, the point having verticality in the section 40 of the high-elevation structure may be denoted by "EP", and the point not having verticality may be denoted by "RP".

The point p38 in the lowermost layer Layer0 in the section 40 of the structure shown in FIG. 6 is denoted by "RP". The reason for this is that the point on the road is not utilized. According to the embodiment, in order to obtain information about a high-elevation structure, verticality is inspected based on the points p31, p32, p33, p34, p35, and p36, which are generated at positions above the predetermined level RL.

Meanwhile, after step 222 shown in FIG. 4, the horizontality inspection unit 124 selects points that satisfy horizontality from among the points that satisfy verticality (step 224).

According to the embodiment, the horizontality inspection unit 124 may select a size and a moving direction of a moving window, and may detect the number of points that satisfy verticality within the moving window, to which points satisfying verticality among the points of the $0^{th}$ to $M-1^{th}$ channels belongs. When the detected number is greater than a predetermined number, it may be determined that the points satisfying verticality also satisfy horizontality.

In addition, according to the embodiment, the size of the moving window used for horizontality inspection may vary depending on the coordinates of a horizontality inspection target point. For example, the horizontality inspection unit 124 may include a third look-up table (LUT) (not shown). The third LUT may receive the coordinates of a horizontality inspection target point (i.e. the address of the third LUT) as input, and may output the size of the moving window (i.e. the data of the third LUT) stored for the corresponding address.

Figure 7:
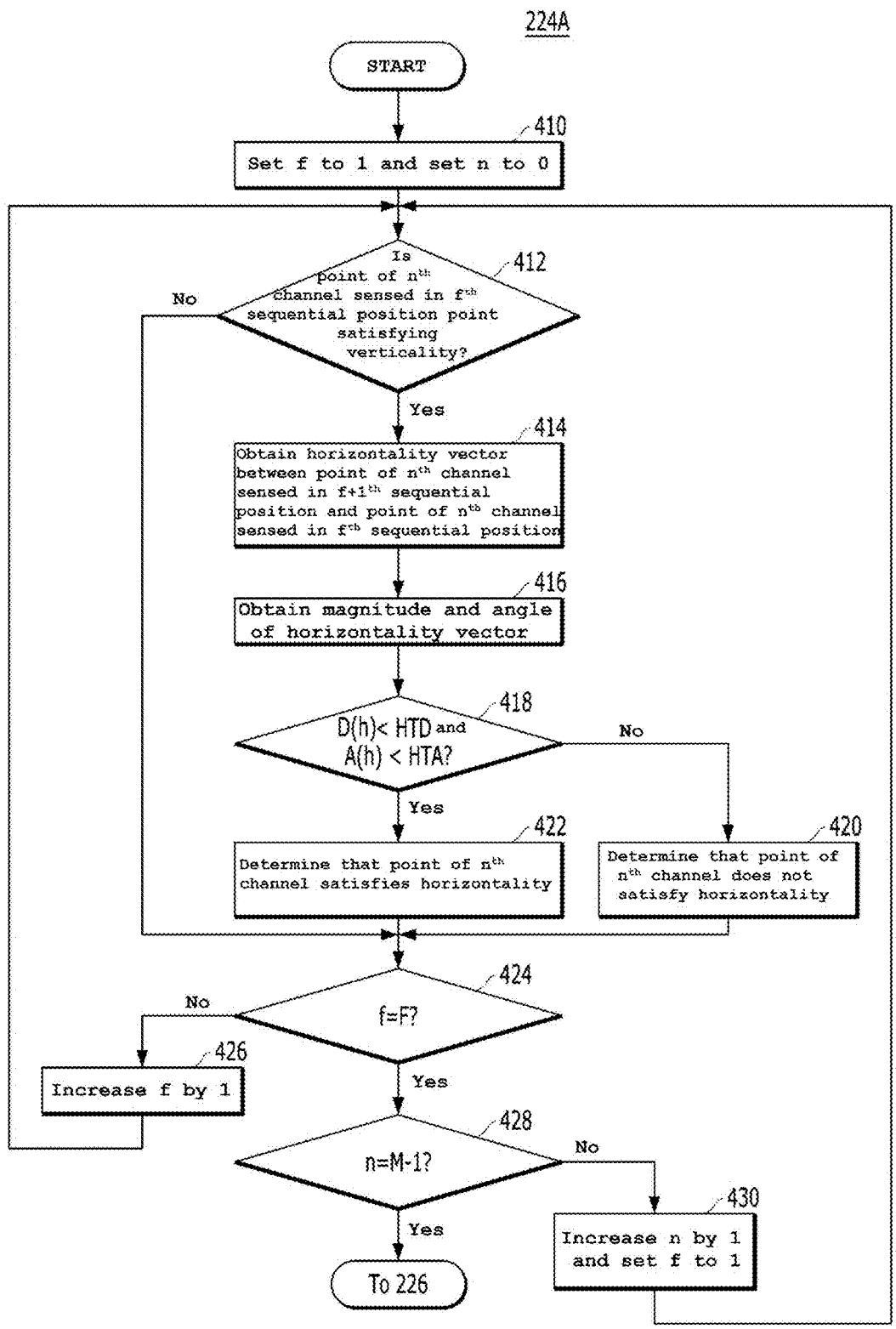
FIG. 7 is a flowchart of an embodiment of step 224 shown in FIG. 4.

FIG. 7 is a flowchart of an embodiment 224A of step 224 shown in FIG. 4. Step 224A shown in FIG. 7 may be performed by the horizontality inspection unit 124 shown in FIG. 3.

Referring to FIG. 7, f is set to 1, and n is set to 0 (step 410). f has the same meaning as f described above with reference to FIG. 5. Here, $0 \leq n \leq M-1$.

After step 410, whether the point PNT(f,n) of the $n^{th}$ channel sensed in the $f^{th}$ sequential position is a point satisfying verticality is checked (step 412). If it is determined in step 222 that the point PNT(f,n) of the $n^{th}$ channel sensed in the $f^{th}$ sequential position is a point that does not satisfy verticality, horizontality inspection is not performed on the point PNT(f,n) of the $n^{th}$ channel sensed in the $f^{th}$ sequential position, and the process goes to step 424.

However, when it is determined in step 222 that the point PNT(f,n) of the $n^{th}$ channel sensed in the $f^{th}$ sequential position is a point that satisfies verticality, a horizontality vector hv between the point PNT(f+1,n) of the $n^{th}$ channel sensed in the f+1$^{th}$ sequential position and the point PNT(f, n) of the $n^{th}$ channel sensed in the $f^{th}$ sequential position is obtained, as expressed using Equation 3 below (step 414).

$$hv = PNT(f+1,n) - PNT(f,n) \quad \text{[Equation 3]}$$

After step 414, the magnitude D(h) and the angle A(h) (or direction) of the horizontality vector hv are obtained (step 416).

After step 416, whether the obtained magnitude D(h) is less than a horizontal threshold magnitude HTD and whether the obtained angle A(h) is less than a horizontal threshold angle HTA are checked (step 418). To this end, the horizontality inspection unit 124 may include fourth and fifth look-up tables (LUTs) (not shown). The fourth LUT may receive the coordinates of a horizontality inspection target point (i.e. the address of the fourth LUT) as input, and may output the horizontal threshold magnitude HTD (i.e. the data of the fourth LUT) stored for the corresponding address. The fifth LUT may receive the coordinates of a horizontality inspection target point (i.e. the address of the fifth LUT) as input, and may output the horizontal threshold angle HTA (i.e. the data of the fifth LUT) stored for the corresponding address.

If the obtained magnitude D(h) is not less than the horizontal threshold magnitude HTD, or if the obtained angle A(h) is not less than the horizontal threshold angle HTA, it is determined that the point PNT(f,n) of the $n^{th}$ channel is a point that does not satisfy horizontality (step 420).

However, when the obtained magnitude D(h) is less than the horizontal threshold magnitude HTD and the obtained angle A(h) is less than the horizontal threshold angle HTA, it is determined that the point PNT(f,n) of the $n^{th}$ channel is a point that satisfies horizontality (step 422).

After step 420 or step 422, whether f is F is checked (step 424). That is, whether the first (f=1) to $F^{th}$ (f=F) horizontality inspection processes have been completely performed on the points of the M channels is checked.

If f is not F, f is increased by 1 (step 426). After step 426, if verticality is satisfied in step 412, step 414 is performed in order to update the horizontality vector, and steps 416 to 422 are performed on the updated horizontality vector.

However, if f is F, whether n is M−1 is checked (step 428). That is, whether the horizontality inspection has been completely performed on the points of the $0^{th}$ to M−1th channels is checked.

If n is M−1, the process goes to step 226. However, if n is not M−1, n is increased by 1, f is set to 1, and thereafter, the process goes to step 412 (step 430). After step 430, if verticality is satisfied in step 412, step 414 is performed in order to update the horizontality vector, and steps 416 to 422 are performed on the updated horizontality vector.

That is, whether the point PNT(f,n) of the $n^{th}$ channel ($0 \leq n \leq M-1$) sensed in the $f^{th}$ sequential position satisfies horizontality may be checked by performing steps 414 to 422 shown in FIG. 7.

Hereinafter, in order to help understanding the process shown in FIG. 7, the horizontality inspection unit 124 shown in FIG. 3 and step 224A shown in FIG. 7 will be described with reference to FIG. 8. However, the embodiment is not limited to the process shown in FIG. 8.

Figure 8:
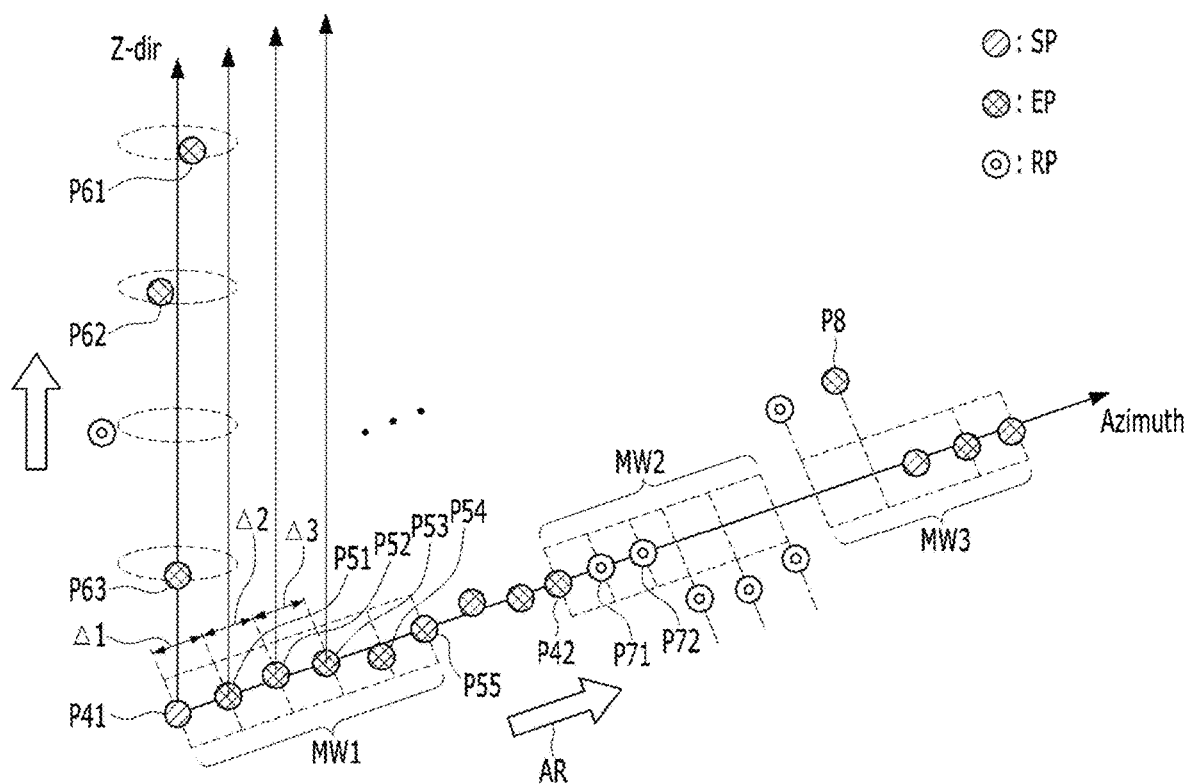
FIG. 8 is a diagram for helping understanding a horizontality inspection unit and step 224A.

FIG. 8 is a diagram for helping understanding the horizontality inspection unit 124 and step 224A. Here, SP, EP and RP have the same meaning as SP, EP and RP shown in FIG. 6, respectively, and MW1, MW2 and MW3 denote moving windows, which move in the direction indicated by the arrow AR.

Referring to FIG. 8, when f is 1 and n is 0, whether the point p41 (PNT(1,0)) of the $0^{th}$ channel sensed first (f=1) satisfies verticality is checked (step 412). As shown in FIG. 8, since the point p41 (PNT(1,0)) vertically overlaps other points p61, p62 and p63, it satisfies verticality.

Therefore, a horizontality vector hv between the point P41 (PNT(1,0)) of the $0^{th}$ channel sensed first (f=1) and the point P51 (PNT(2,0)) of the $0^{th}$ channel sensed second (f=2) is obtained (step 414). Thereafter, whether the magnitude D(h) of the horizontality vector hv is less than the horizontal threshold magnitude HTD and whether the angle A(h) of the horizontality vector hv is less than the horizontal threshold angle HTA are checked (step 418). At this time, since the number (i.e. 5) of points p51, p52, p53, p54 and p55 that satisfy verticality within the moving window MW1 to which the point p41 belongs is greater than a predetermined number (e.g. 3), the magnitude D(h) of the horizontality vector hv is less than the horizontal threshold magnitude HTD, and the angle A(h) of the horizontality vector hv is less than the horizontal threshold angle HTA. Therefore, it is determined that the point p41 of the $0^{th}$ channel is a point having horizontality (step 422).

Similar to the above-described operation of checking whether the point p41 has horizontality, horizontality inspection is performed on the point p51 of the $0^{th}$ channel sensed in the subsequent f+$1^{th}$ sequential position, which has verticality, by moving the moving window MW1 by a first movement amount A1 in the direction indicated by the arrow AR, on the point p52 of the $0^{th}$ channel sensed in the subsequent f+$2^{th}$ sequential position, which has verticality, by further moving the moving window MW1 by a second movement amount A2 in the direction indicated by the arrow AR, and on the point p53 of the $0^{th}$ channel sensed in the subsequent f+$3^{th}$ sequential position, which has verticality, by further moving the moving window MW1 by a third movement amount A3 in the direction indicated by the arrow AR.

Subsequently, although it is determined that the point p42 of the $0^{th}$ channel is a point having verticality, there is no point satisfying verticality within the moving window MW2 to which the point p42 belongs. Therefore, although the point p42 has verticality, it may be determined not to have horizontality (step 420).

According to the embodiment, although the points p71 and p72 are determined to be points corresponding to the structure, if they are determined to be points that do not correspond to the structure as a result of later verification, these points p71 and p72 may be used rather than being removed. However, although the point p8 is determined to be a point that does not correspond to the structure, if it is determined to be a point corresponding to the structure as a result of later verification, this point p8 may be removed.

Meanwhile, after step 224, the point-filtering unit 126 may remove points having noise from among points satisfying both verticality and horizontality by performing density inspection (step 226). Although a certain point satisfies both verticality and horizontality, if the density of the point is low, the point satisfying both verticality and horizontality is highly likely to be a point having noise (e.g. a leaf or a branch of the tree 30 shown in FIG. 6 or an unusual part of a high-elevation structure).

FIG. 9 is a flowchart of an embodiment 226A of step 226 shown in FIG. 4. Step 226A shown in FIG. 9 may be performed by the point-filtering unit 126 shown in FIG. 3.

Referring to FIG. 9, a tree is constructed based on points satisfying both verticality and horizontality (step 510). For example, a k-d tree may be generated for points satisfying both verticality and horizontality.

After step 510, the number of points that are the nearest to respective points of the constructed tree is detected (step 512).

After step 512, whether the detected number is greater than a threshold number is checked (step 514). If the detected number is greater than the threshold number, points satisfying both verticality and horizontality are determined to be points related to a high-elevation structure, which do not have noise (step 516). However, if the detected number is not greater than the threshold number, points satisfying both verticality and horizontality may be determined to be points having noise, and may be removed (step 518).

FIG. 10A shows the state in which noise is not removed before step 226A is performed, and FIG. 10B shows the state in which noise is removed by performing step 226A. In FIG. 10B, a point 530 is a residual point for recognition of a high-elevation structure after step 226A is performed.

As shown in FIG. 10A, it can be seen that a large number of meaningless points are distributed in a high-elevation structure due to noise such as trees or unusual parts of the structure. If this noise is not removed, the probability of generating a cluster for recognition of a high-elevation structure decreases.

On the other hand, when noise is removed, as shown in FIG. 10B, the probability of generating a cluster for recognition of a high-elevation structure may increase.

Hereinafter, an embodiment 130A of the information-generating unit 130 shown in FIG. 1 and an embodiment 230A of step 230 shown in FIG. 2 will be described with reference to the accompanying drawings.

Figure 11:
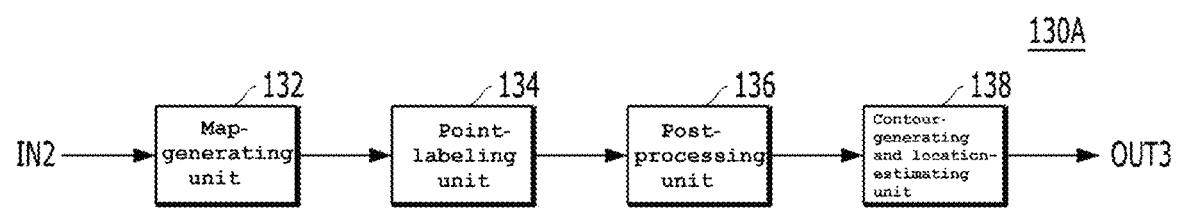
FIG. 11 is a block diagram of an embodiment of the information-generating unit shown in FIG. 1.
Figure 12:
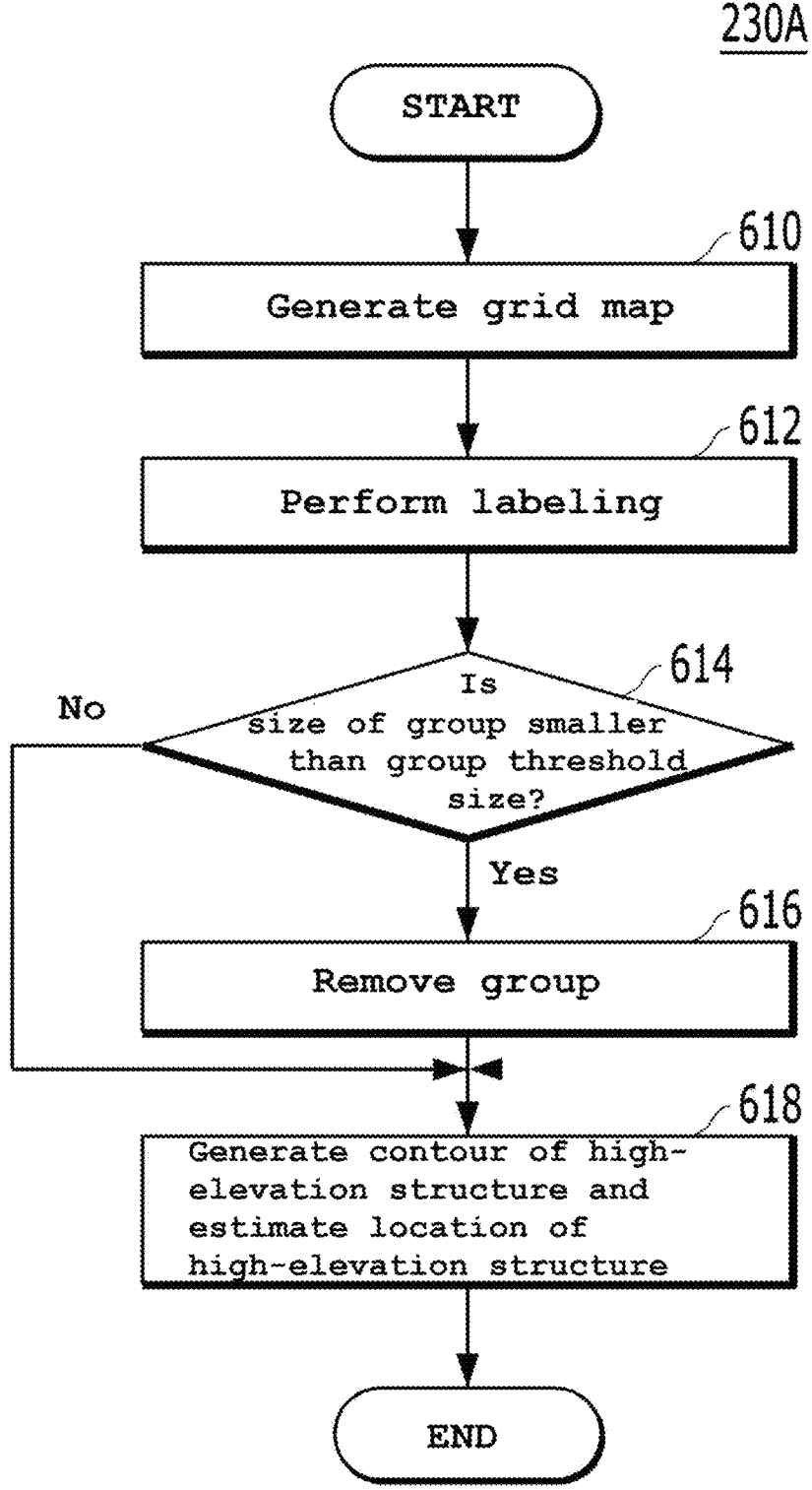
FIG. 12 is a flowchart of an embodiment of step 230 shown in FIG. 2.

FIG. 11 is a block diagram of an embodiment 130A of the information-generating unit 130 shown in FIG. 1, and FIG. 12 is a flowchart of an embodiment 230A of step 230 shown in FIG. 2.

The information-generating unit 130A shown in FIG. 11 may include a map-generating unit 132, a point-labeling unit 134, and a contour-generating and location-estimating unit 138. In addition, the information-generating unit 130A may further include a post-processing unit 136.

After step 220, the map-generating unit 132 receives points related to a high-elevation structure, which are extracted by the point-extracting unit 120 (120A), through an input terminal IN2, and generates a grid map based on these points (step 610). For example, a circular-shaped two-dimensional (2D) grid map may be generated in order to perform 2D-pixel-based clustering.

FIG. 13A shows the state before step 610 is performed, and FIG. 13B shows the state after step 610 is performed.

With respect to a point 620 related to a high-elevation structure shown in FIG. 13A, which is extracted by the point-extracting unit 120 (120A), a circular-shaped 2D grid map 622 may be generated, as shown in FIG. 13B.

FIG. 14A shows the state before step 612 is performed in pixel units, and FIG. 14B shows the state after step 612 is performed.

After step 610, the point-labeling unit 134 labels points on the grid map shown in FIG. 14A in a two-dimensional form, as shown in FIG. 14B (step 612). For example, labeling may be performed in a 2D-pixel-based region growing manner. When labeling is performed in this way, a plurality of groups 630 may be obtained, as shown in FIG. 14B.

Figure 15A:
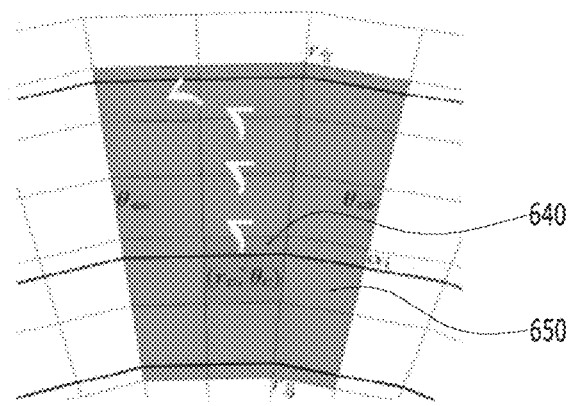
FIG. 15A is a diagram for explaining the process of performing region growing.
Figure 15B:
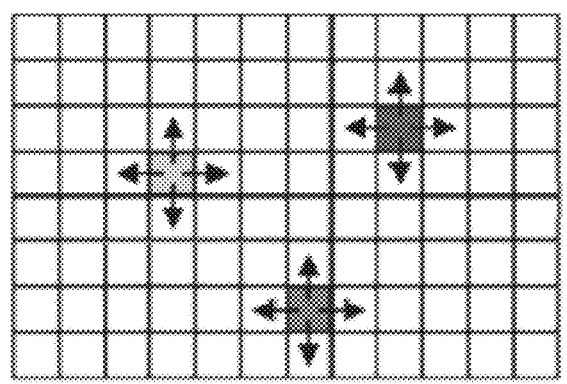
FIG. 15B shows the state before region growing is performed.
Figure 15C:
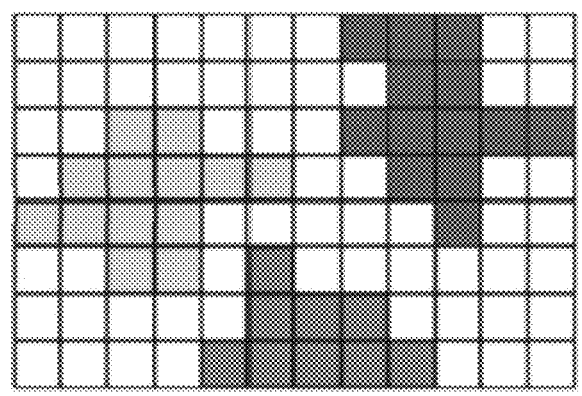
FIG. 15C shows the state after region growing is performed.

FIG. 15A is a diagram for explaining the process of performing region growing, FIG. 15B shows the state before region growing is performed, and FIG. 15C shows the state after region growing is performed.

According to a clustering generation method using region growing, a region is expanded while searching is performed on the basis of a start pixel 640, as shown in FIG. 15A. Pixels may be searched using, for example, a depth first search (DFS) algorithm. In FIG. 15A, a voxel 650 labeled with the same identification (ID) as the start pixel 640 is shown. Referring to FIG. 15C, it can be seen that, when generated pixels are adjacent to the start pixel, they are labeled.

After step 612, the post-processing unit 136 removes a group having a size smaller than a group threshold size from among the groups labeled by the point-labeling unit 134 (step 616). As a result of labeling, clusters generated as small objects may be removed through post-processing.

After step 616, the contour-generating and location-estimating unit 138 may generate the contour of a high-elevation structure by connecting the contours of the groups that are not removed by the post-processing unit 136, may estimate the location where the generated contour is present as the location of the high-elevation structure, and may output the generated contour and the estimated location as information about the high-elevation structure through an output terminal OUT3 (step 618).

If step 616 is omitted, the contour-generating and location-estimating unit 138 may generate the contour of a high-elevation structure by connecting the contours of the groups labeled by the point-labeling unit 134, and may estimate the location where the generated contour is present as the location of the high-elevation structure.

Figure 16A:
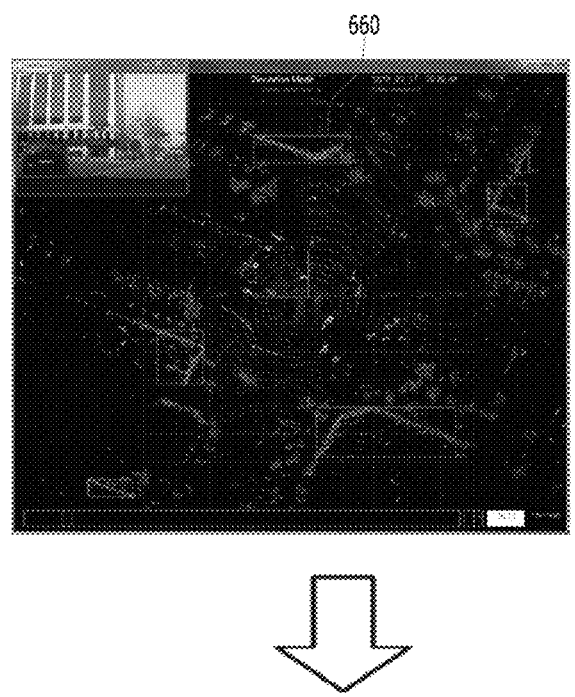
FIG. 16A shows the state before the contour of a high-elevation structure is generated.
Figure 16B:
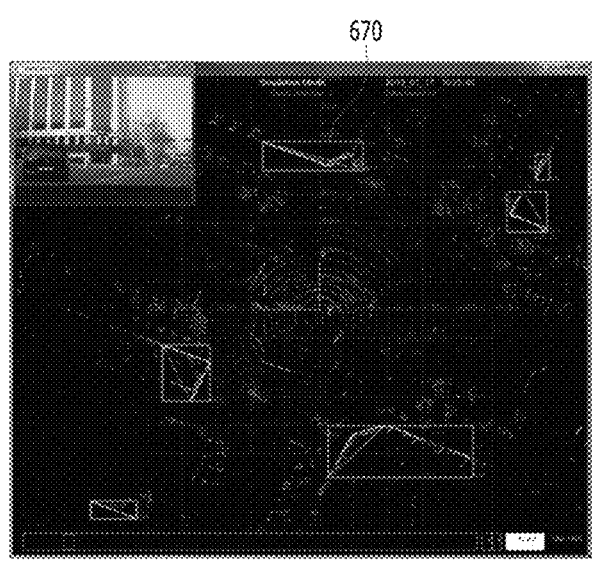
FIG. 16B shows the state after the contour of a high-elevation structure is generated.

FIG. 16A shows the state before the contour of a high-elevation structure is generated, and FIG. 16B shows the state after the contour of a high-elevation structure is generated.

After step 616, curve fitting may be performed on the basis of the labeled cluster pixel 660 shown in FIG. 16A, thereby generating the contour 670 of a high-elevation structure, as shown in FIG. 16B (step 618). The curve fitting may be performed in units of labeled clusters, and the labeled clusters may be fitted in the shape of a combination of straight lines through a general regression methodology.

According to the apparatus 100 and the method 200 for recognizing a high-elevation structure according to the embodiment, it is possible to rapidly correct an error of a global positioning system (GPS) of a host vehicle using information about a high-elevation structure, which is output from the information-generating unit 130 shown in FIG. 1 through the output terminal OUT1. For example, information about a high-elevation structure may be used to assist the host vehicle to precisely estimate the location thereof. Accordingly, the embodiment is capable of assisting the host vehicle to accurately operate an autonomous driving determination module.

In addition, because a high-elevation structure is highly likely to be a landmark of a corresponding area, the apparatus 100 and the method 200 for recognizing a high-elevation structure according to the embodiment may also be utilized in calibration logic for improving the performance of execution of functions related to recognition of the surrounding environment (e.g. a road boundary).

In addition, according to the apparatus 100 and the method 200 for recognizing a high-elevation structure according to the embodiment, since estimation of a situation such as an intersection is possible, the performance of tracking a dynamic object (particularly an object that turns) in a specific situation may be improved.

As is apparent from the above description, the apparatus and the method for recognizing a high-elevation structure using a LiDAR sensor according to the embodiment are capable of rapidly correcting an error of a global positioning system (GPS) of a host vehicle using information about a high-elevation structure, of assisting the host vehicle to accurately operate an autonomous driving determination module because the information about a high-elevation structure can be used to assist in precisely estimating the location of the host vehicle, of being utilized in calibration logic for improving the performance of execution of functions related to recognition of the surrounding environment (e.g. a road boundary), and of improving the performance of tracking a dynamic object (particularly an object that turns) in a specific situation.

However, the effects achievable through the disclosure are not limited to the above-mentioned effects, and other effects not mentioned herein will be clearly understood by those skilled in the art from the above description.

The above-described various embodiments may be combined with each other without departing from the objects of the present disclosure unless they are incompatible with each other.

In addition, for any element or process that is not described in detail in any of the various embodiments, reference may be made to the description of an element or a process having the same reference numeral in another embodiment unless otherwise specified.

While the present disclosure has been particularly shown and described with reference to exemplary embodiments thereof, these embodiments are only proposed for illustrative purposes and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. An apparatus for recognizing a high-elevation structure using a light detection and ranging (LiDAR) sensor, the apparatus comprising:
   an object-sensing unit configured to output a point cloud, acquired by sensing an object, as LiDAR data;
   a point-extracting unit configured to extract points associated with the high-elevation structure from among points included in the LiDAR data, the high-elevation structure being an object having a height greater than or equal to a predetermined level; and
   an information-generating unit configured to:
      generate a contour of the high-elevation structure;
      estimate a location of the high-elevation structure using the extracted points; and
      output the generated contour and the estimated location as information representing the high-elevation structure,
   wherein the point-extracting unit further comprises:
      a verticality inspection unit configured to select points satisfying verticality from among the points included in the LiDAR data;
      a horizontality inspection unit configured to select points satisfying horizontality from among the points satisfying the verticality; and
      a point-filtering unit configured to remove points having noise from among points satisfying both the verticality and the horizontality, through a density inspection.

2. The apparatus according to claim 1, wherein the verticality inspection unit is configured to:
   when points of $0^{th}$ to $M-1^{th}$ channels are sensed simultaneously at every predetermined unit angle (x) where M is a positive integer of 2 or greater, and a point of each channel vertically overlaps a point of another channel, determine that the point of each channel satisfies the verticality.

3. The apparatus according to claim 1, wherein the point-filtering unit is configured to:
   construct a tree based on points satisfying both the verticality and the horizontality;
   detect the number of points that are within a predetermined range of respective points of the constructed tree;

when the detected number is not greater than a threshold number, determine that the points satisfying both the verticality and the horizontality are points having noise; and remove the points having noise.

4. The apparatus according to claim 1, wherein the information-generating unit further comprises:

a map-generating unit configured to generate a grid map based on the extracted points associated with the high-elevation structure;

a point-labeling unit configured to label points on the grid map; and a contour-generating and location-estimating unit configured to:

generate a contour of the high-elevation structure by connecting contours of groups labeled by the point-labeling unit; and estimate a location where the generated contour is present as a location of the high-elevation structure.

5. The apparatus according to claim 4, wherein the information-generating unit further comprises:

a post-processing unit configured to remove a group having a size smaller than a group threshold size from among the groups labeled by the point-labeling unit.

6. An apparatus for recognizing a high-elevation structure using a light detection and ranging (LiDAR) sensor, the apparatus comprising:

an object-sensing unit configured to output a point cloud, acquired by sensing an object, as LiDAR data;

a point-extracting unit configured to extract points associated with the high-elevation structure from among points included in the LiDAR data, the high-elevation structure being an object having a height greater than or equal to a predetermined level; and an information-generating unit configured to:

generate a contour of the high-elevation structure;

estimate a location of the high-elevation structure using the extracted points; and output the generated contour and the estimated location as information representing the high-elevation structure, wherein the point-extracting unit further comprises:

a verticality inspection unit configured to select points satisfying verticality from among the points included in the LiDAR data;

a horizontality inspection unit configured to select points satisfying horizontality from among the points satisfying the verticality; and a point-filtering unit configured to remove points having noise from among points satisfying both the verticality and the horizontality, through a density inspection;

wherein the verticality inspection unit is configured to:

when points of $0^{th}$ to $M-1^{th}$ channels are sensed simultaneously at every predetermined unit angle (x) where M is a positive integer of 2 or greater, and a point of each channel vertically overlaps a point of another channel, determine that the point of the each channel satisfies the verticality:

in order to check whether a point of an $m^{th}$ ($1 \le m \le M$) channel satisfies the verticality, obtain a verticality vector between a point (PNT(f,m)) ($1 \le f \le F$, $F=360/x$) of the $m^{th}$ channel and a point (PNT(f,m−k)) of an $m-k^{th}$ ($1 \le k \le M$) channel;

obtain a magnitude and an angle of the verticality vector; and determine that the point of the $m^{th}$ channel is a point satisfying the verticality when the obtained magnitude is less than a vertical threshold magnitude and the obtained angle is less than a vertical threshold angle.

7. The apparatus according to claim 6, wherein the horizontality inspection unit is configured to:

select a size and a moving direction of a moving window;

detect the number of points that satisfy the verticality within the moving window to which points satisfying the verticality among the points of the $0^{th}$ to $M-1^{th}$ channels belong; and determine that the points satisfying the verticality also satisfy the horizontality when the detected number is greater than a predetermined number.

8. The apparatus according to claim 7, wherein the horizontality inspection unit is configured to:

in order to check whether a point (PNT(f,n)) of an $n^{th}$ channel ($0 \le n \le M-1$) sensed in an $f^{th}$ sequential position satisfies the horizontality, obtain a horizontality vector between a point (PNT(f+1,n)) of the $n^{th}$ channel sensed in an $f+1^{th}$ sequential position and the point (PNT(f,n)) of the $n^{th}$ channel sensed in the $f^{th}$ sequential position when the point (PNT(f,n)) of the $n^{th}$ channel is a point satisfying the verticality;

obtain a magnitude and an angle of the horizontality vector; and determine that the point (PNT(f,n)) of the $n^{th}$ channel is a point satisfying the horizontality when the obtained magnitude is less than a horizontal threshold magnitude and the obtained angle is less than a horizontal threshold angle.

9. The apparatus according to claim 6, wherein the point-filtering unit is configured to:

construct a tree based on points satisfying both the verticality and the horizontality;

detect the number of points that are within a predetermined range of respective points of the constructed tree;

when the detected number is not greater than a threshold number, determine that the points satisfying both the verticality and the horizontality are points having noise; and remove the points having noise.

10. The apparatus according to claim 6, wherein the information-generating unit further comprises:

a map-generating unit configured to generate a grid map based on the extracted points associated with the high-elevation structure;

a point-labeling unit configured to label points on the grid map; and a contour-generating and location-estimating unit configured to:

generate a contour of the high-elevation structure by connecting contours of groups labeled by the point-labeling unit; and estimate a location where the generated contour is present as a location of the high-elevation structure.

11. The apparatus according to claim 10, wherein the information-generating unit further comprises:

a post-processing unit configured to remove a group having a size smaller than a group threshold size from among the groups labeled by the point-labeling unit.

12. A method of recognizing a high-elevation structure using a light detection and ranging (LiDAR) sensor, the method comprising:

acquiring a point cloud as LiDAR data by sensing an object;

extracting points associated with a high-elevation structure from among points included in the LiDAR data, the high-elevation structure being an object having a height greater than or equal to a predetermined level;

generating a contour of the high-elevation structure; estimating a location of the high-elevation structure using the extracted points; and determining that the generated contour and the estimated location is information representing the high-elevation structure, wherein extracting the points comprises:

selecting points satisfying verticality from among the points included in the LiDAR data;

selecting points satisfying horizontality from among the points satisfying the verticality; and removing points having noise from among points satisfying both the verticality and the horizontality, through a density inspection.

13. The method according to claim 12, wherein selecting the points satisfying the verticality comprises:

when points of $0^{th}$ to $M-1^{th}$ channels are sensed simultaneously at every predetermined unit angle (x) where M is a positive integer of 2 or greater, and a point of each channel vertically overlaps a point of another channel, determining that the point of each channel satisfies the verticality.

14. The method according to claim 13, wherein determining that the point of each channel satisfies the verticality comprises:

checking whether a point of an $m^{th}$ ($1 \le m \le M$) channel satisfies the verticality;

obtaining a verticality vector between a point (PNT(f,m)) ($1 \le f \le F$, $F=360/x$) of the $m^{th}$ channel and a point (PNT(f,m-k)) of an $m-k^{th}$ ($1 \le k \le M$) channel;

obtaining a magnitude and an angle of the verticality vector; and when the obtained magnitude is less than a vertical threshold magnitude and the obtained angle is less than a vertical threshold angle, determining that the point of the $m^{th}$ channel is a point satisfying the verticality.

15. The method according to claim 14, wherein selecting points satisfying the horizontality comprises:

selecting a size and a moving direction of a moving window;

detecting the number of points that satisfy the verticality within the moving window to which points satisfying the verticality among the points of the $0^{th}$ to $M-1^{th}$ channels belong; and determining that the points satisfying the verticality also satisfy the horizontality when the detected number is greater than a predetermined number.

16. The method according to claim 15, wherein determining that the points satisfying the verticality satisfy the horizontality comprises:

checking whether a point (PNT(f,n)) of an $n^{th}$ channel ($0 \le n \le M-1$) sensed in an $f^{th}$ sequential position satisfies the horizontality;

obtaining a horizontality vector between a point (PNT(f+1,n)) of the $n^{th}$ channel sensed in an $f+1^{th}$ sequential position and the point (PNT(f,n)) of the $n^{th}$ channel sensed in the $f^{th}$ sequential position when the point (PNT(f,n)) of the $n^{th}$ channel is a point satisfying the verticality;

obtaining a magnitude and an angle of the horizontality vector; and when the obtained magnitude is less than a horizontal threshold magnitude and the obtained angle is less than a horizontal threshold angle, determining that the point (PNT(f,n)) of the $n^{th}$ channel is a point satisfying the horizontality.

17. The method according to claim 12, wherein removing points having noise through the density inspection comprises:

constructing a tree based on points satisfying both the verticality and the horizontality;

detecting the number of points that are within a predetermined range of respective points of the constructed tree;

when the detected number is not greater than a threshold number, determining that the points satisfying both the verticality and the horizontality are points having noise; and removing the points having noise.

18. The method according to claim 12, wherein generating the contour of the high-elevation structure and estimating the location of the high-elevation structure comprises:

generating a grid map based on the extracted points associated with the high-elevation structure;

labeling points on the grid map;

generating the contour of the high-elevation structure by connecting contours of labeled groups; and estimating a location where the generated contour is present as the location of the high-elevation structure.

19. The method according to claim 18, wherein generating the contour of the high-elevation structure and estimating the location of the high-elevation structure further comprises:

removing a group having a size smaller than a group threshold size from among the labeled groups.

* * * * *